ABSTRACT OF THE DISCLOSURE

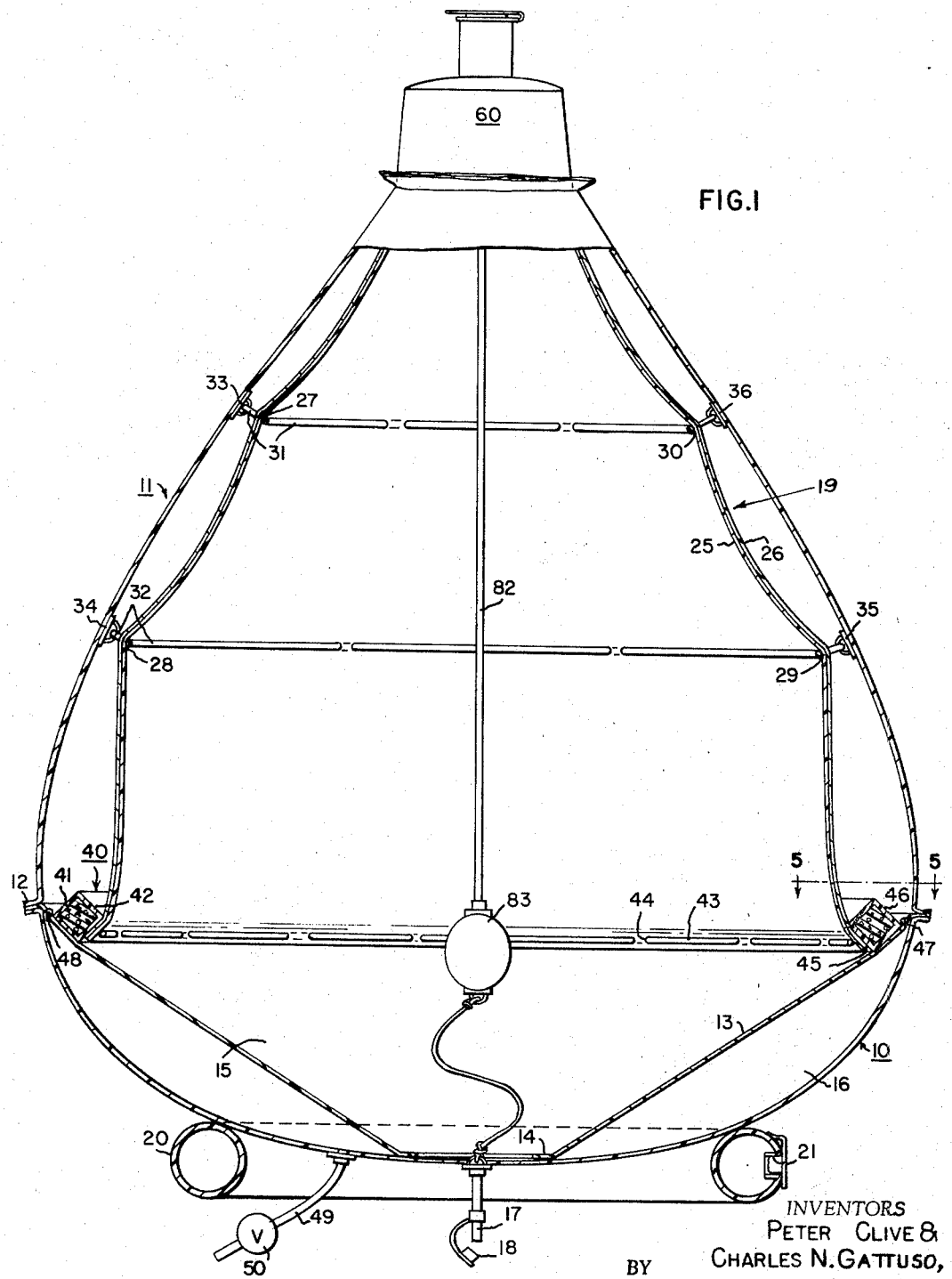

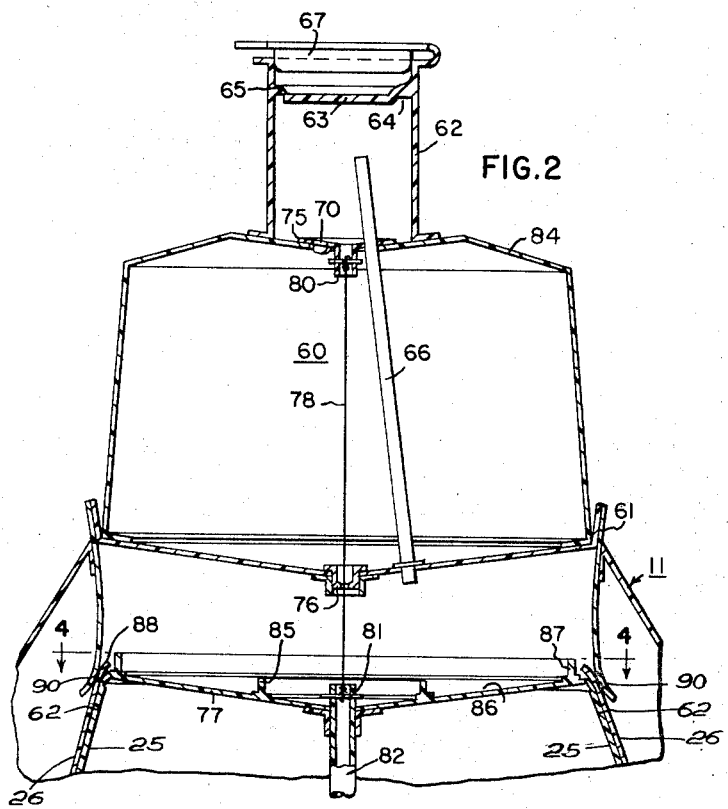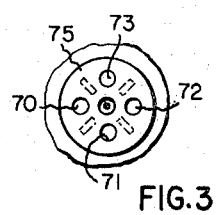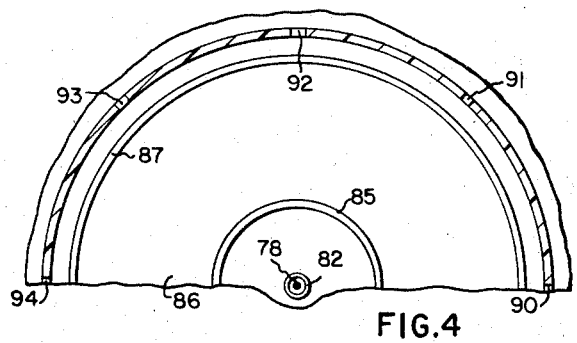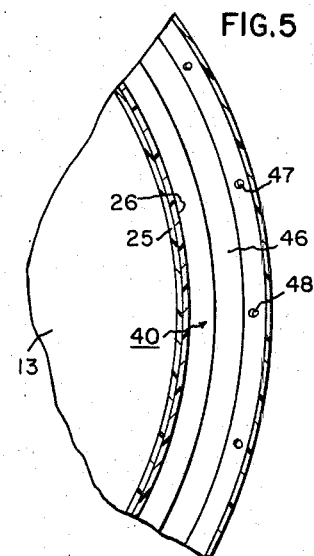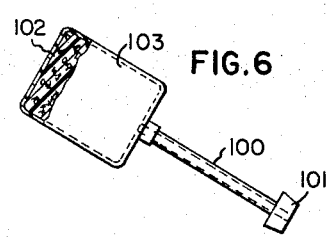
INVENTORS
PETER CLIVE &
CHARLES N. GATTUSO, 3,367,843
INFLATABLE PEAR SHAPED SOLAR STILL
Peter Clive, River Edge, and Charles N. Gattuso, North Arlington, N.J., assignors to Aquador Plastics, Inc., Brooklyn, N.Y., a corporation of New York
Filed Sept. 21, 1964, Ser. No. 397,742
28 Claims. (Cl. 202—176)

A solar still having a flexible light transmitting outer sheet material and a heat absorbing evaporator member within the outer sheet material upon which sea water is evaporated and collected on the outer sheet material, an excess sea water compartment for collecting any sea water draining from the evaporator member, means to collect the distilled water from the inner surface of the outer bag, a means for directing any excess sea water from the evaporator member into the excess sea water compartment which may be a separator ring of larger diameter than the maximum diameter of the evaporator member and the solar still may have a stabilizer ring, a sea water reservoir adjacent the top of the bag and a pendulum and filament extending through a feed hole in the sea water reservoir to prevent clogging of the feed hole.

---

The present invention relates to a solar still and is an improvement on the types of solar stills described in United States Patents 2,455,834 and 2,455,835 issued to A. E. Ushakoff on Dec. 7, 1948.

The principles of operation of solar stills of the type described in the above-mentioned patents are well known. Such stills are customarily used by persons adrift in life rafts on the high seas to provide drinking water until rescue. The still is adapted to be inflated and floated on the ocean while tethered to the life raft. Sea water is passed through the still in a manner to be evaporated by the sun's rays and to be condensed on a collecting surface of the still that is cooler than the evaporating surface within the still. The water thus collected is distilled water which so long as it does not become contaminated with sea water is potable.

A major problem exists with the operation of the spherical still described by the aforementioned patents in that tilting of the still while floating on comparatively rough water causes sea water to fall or be thrown off of the evaporating surface and be mixed with the condensed water. Also, the stills of the prior art tend to become clogged and also to stop evaporation, due to an impreciseness of the feed of sea water to the evaporating surface.

It is a principal object of the present invention to provide an improved form of inflatable solar still that may be floated in a rough sea without contaminating the distilled water with sea water from the evaporator surface.

Another important object of the present invention is to provide an improved solar still having novel means for uniformly feeding and dispersing sea water over the entire evaporator surface so long as there is sea water in the sea water reservoir of the still.

Yet another object of the invention is to provide an improved form of inflatable solar still that is a completely closed system containing gas under pressure to inflate the still together with sea water to be evaporated, condensed or distilled water and surplus unevaporated sea water all within the still in a balanced and equalized manner whereby the flowing of sea water downward by gravity over the evaporator surface and the flowing of condensed water by gravity over the condensing surface is spontaneous yet controlled during the entire operation of the still.

Yet another important object of the present invention is to provide an improved form of solar still that is simple to inflate and place into operation and is so arranged as to minimize the collection of any sea water in the distilled water compartment during the set-up of the still even in rough weather.

A still further object of the present invention is to provide an improved inflatable solar still adapted to be floated on the sea and having arrangements responsive to the motions of the sea to clean and prevent clogging of the still in its operation.

Another important object of the invention is to provide means for flushing salt crystals collected on the evaporator surface when such crystals accumulate to a point where efficiency of the still is impaired.

A primary feature of the collapsible and inflatable solar still of the invention is the unique pear shape of the still bag when inflated to form a generally hemi-spherical lower or base section and a generally conical upper section. A ring shaped ballast tube adapted to be filled with sea water or the like is attached to the exterior of the base section of the still in a manner to cause the inflated still to float upright in the water with the upper conical section extending upwards out of the water. The upper conical section of the still is formed of light transmitting flexible sheet material. Supported within the still in spaced relation thereto is an evaporator black surface also of generally conical shape. At the base of the conical section of the still between the evaporator surface and the outer still wall is a separator ring having a minimum diameter at least slightly greater than the maximum diameter of the conical shaped evaporator surface. Sea water flowing down the evaporator surface and not evaporated arrives at the separator ring and is deflected thereby into the interior of the still while condensed or distilled water flowing down the inside surface of the outer wall or condensing surface of the still is deflected thereby into a distilled water collecting compartment. Since the evaporator surface is conical in shape and the separator ring is larger in diameter than the base of the conical evaporator surface, it is impossible for sea water on the evaporator surface to fall past the separator ring into the fresh water compartment when the still is tilted by wave action on the ocean surface.

Another important feature of the invention is the provision of a pendulum arrangement within the still by means of which the sea water feed hole in the bottom of the sea water reservoir is constantly cleaned of clogging salt crusts by the wave motion of the still as it floats on the sea.

Other features of the invention to be later described in more detail are included in the arrangement of an upper sea water reservoir, a sea water collecting and distributing surface below the reservoir, a plurality of equi-radially positioned distributing feed holes for feeding the sea water from the distributing surface uniformly over the apex of the conical evaporator surface, a surplus sea water collecting compartment, and a distilled water collecting compartment all enclosed in a water and gas tight closed system that is arranged to equalize the pressure throughout so that the normal flow action of the still is entirely by gravity.

Further objects, features and the attendant advantages of the invention will be apparent with reference to the following specification and drawings in which:

FIG. 1 is an elevational view partly in section of the collapsible solar still of the invention in its inflated form;

FIG. 2 is a fragmentary section of the sea water reservoir at the apex of the upper conical section of the still;

FIG. 3 is a detail of the re-enforcement disk and cleaning filament support at the top of the sea water reservoir;

FIG. 4 is a fragmentary section on the line 4—4 of FIG. 2;

FIG. 5 is a fragmentary section on the line 5—5 of FIG. 1; and

FIG. 6 is an elevational view partly in section of a hand pump that may be used to fill the ballast tube and the sea water reservoir with sea water when setting up the still.

Referring first to FIG. 1 of the drawings, the general arrangement of the solar still of the invention will be described. It will be seen that the outer envelope or bag of the still when inflated for use is generally pear shaped having a lower or base section 10 of generally hemispherical configuration and an upper section 11 of generally conical shape. The envelope sections 10 and 11 are preferably formed of flexible sheet plastic material that is generally light transparent such as frosty clear vinyl material and are heat sealed together at 12. A generally conical shaped separator diaphragm member 13 is also joined at the heat sealed joint 12 and at 14 near the base of the still envelope to form an excess sea water compartment 15 and a distilled water compartment 16 within the base section of the still. A sea water drain tube 17 which is provided with a valve 18 at the end extends for a predetermined length below the base of the still and communicates with the excess sea water compartment 15.

A ring shaped stabilizer tube 20 is secured in any suitable manner such as by plastic adhesive or heat sealing to the exterior of the hemi-spherical base of the still and is provided with a valved opening 21 through which sea water may be passed to the interior of the tube. The entire still assembly is proportioned such that when it is inflated and the stabilizer ring is filled with sea water and the still is otherwise set up for operation, it may be floated in the ocean with its lower hemi-spherical base section 10 in the water and its upper conical section 11 extending upwards out of the water.

Considering the upper conical section 11 of the still, a conical shaped evaporator member generally indicated at 19 is formed of an inner layer of white vinyl plastic material 25 and a black cloth outer surface 26. The two layers 25 and 26 are suitably secured together by any means, preferably by stitching at suitable points. The evaporator member 19 is supported in spaced relation with the section 11 at a plurality of spaced points about its circumference such as shown at 27, 28, 29 and 30 by means of the cords 31, 32 fastened at a plurality of spaced points around the circumference of the still wall 11 such as shown at 33, 34, 35 and 36. It is very important to maintain proper spacing between the evaporator 19 and the outer transparent wall 11. It has been found that the optimum spacing should be ¾ inch. If the spacing is less than ¾ inch, the outer wall 11 tends to absorb some of the heat from the evaporator 19 which lowers the temperature differential and thus impairs efficiency of operation. On the other hand, if the spacing is much more than 2 inches, the evaporated water particles tend to fill the space between the evaporator 19 and the outer wall 11 without migration to wall 11, and thus tends to form an insulation barrier which decreases efficiency. Furthermore, by decreasing the temperature differential, the water particles do not reach the inner surface of wall 11 as rapidly for the intended condensation purposes. It is also important to maintain the proper concentric relationship between the evaporator 19 and outer wall 11 and in order to avoid human error in manufacture, the evaporator 19 is suspended within the outer wall 11 by means of the aforementioned cords 31 and 32, which cords are freely supported through the suspension points 33 through 36 and apertures through the evaporator 19 thus permitting free relative movement for proper alignment of the evaporator and outer wall 11 during inflation of the still. After the still has been properly inflated, it will be appreciated that the outer wall 11, evaporator 19 and cords 31, 32 all become taut and relative movement between the evaporator 19 and outer wall 11 is prevented.

It will be understood that as sea water flows uniformly down the black cloth surface 26 in a manner to be described, it is evaporated by the absorbed heat from the sun and is condensed on the relatively cooler interior surface of the wall 11 which is cooled by sea breezes, spray and the like and not appreciably heated by the sun's rays passing therethrough. The heat of the sun rays passing through the light transparent plastic material forming wall 11 is absorbed by the black cloth surface 26. The purpose of the inner layer of vinyl plastic material 25 is to form an insulation barrier to reflect the heat absorbed by the cloth layer 26 and prevent loss of heat into the interior of the still. As the ocean water is normally quite cool and as the still is floating on the surface thereof, the interior of the still is maintained at a relatively cool temperature and the plastic material 25 insulates the interior from the black cloth surface 26.

A flexible separator ring 40 which may preferably be comprised of a foam plastic mass 41 enclosed in a plastic jacket or skin 42 is loosely secured to the base of the conical evaporator member 19 by means of a cord 43 passing through pre-punched holes such as the one shown at 44. Excess sea water that is not evaporated and that flows down the surface 26 is deflected by the separator ring 40 through the loose joint 45 into the excess sea water compartment 15 from which it may be drained through the drain tube 17. When the still is being operated on the high seas the valve 18 may be opened and the length of the drain tube 17 beneath the surface of the sea will determine the inflation pressure in the still as will be later more fully described but when the still is operated on land the valve 18 is closed to maintain the inflation pressure of the still.

Again referring to the separator ring 40, it will be noted that its minimum diameter is at least slightly greater than the maximum diameter of the conical shaped evaporator member 25 and its maximum diameter is almost equal to the maximum diameter at the base of the conical section 11 of the outer wall of the still. Therefore, an important advantage of the invention is that tilting motions of the still floating on the ocean cannot enable sea water on the evaporator surface 26 to fall or be thrown onto the distilled water side 46 of the separator ring 40. On the other hand, distilled water flowing down the interior condensing surface of the outer still wall 11 is deflected by the separator ring surface 46 through various ones of the plurality of openings such as shown at 47, 48 (FIGS. 1 and 5) into the distilled water compartment 16. A drain tube 49 and a valve 50 permit the distilled water accumulated in the compartment 16 to be removed. When setting up the still the valve 50 is opened and air or other gas is blown through the tube 49 into the compartment 16 from which it passes through the openings such as 47, 48 and through the loose joint 45 into the interior of the still, it being assumed that the sea water drain valve 18 is closed while inflating the still.

Referring now more particularly to FIGS. 1, 2 and 4 of the drawings, a sea water reservoir 60 is mounted at the apex of the conical still section 11 and heat sealed thereto by the joint 61. A filler neck 62 is formed at the top of the sea water reservoir 60 and a normally closed flap valve 63 hinged at 64 and movable at 65 is integrally molded therewith to maintain the inflation pressure within the still. It will be noted that an equalizer tube 66 passes through the sea water reservoir as shown to permit the inflation gas pressure to be equally distributed throughout all chambers including the sea water reservoir 60 of the still. A manually closable cap 67 is also provided and this cap is opened to permit sea water to be pumped into the sea water reservoir 60 through the flap valve 63 and various of the openings 70–73 in the re-enforcement disk 75. The equalizer tube 66 is shown to be passed through opening 72 of the disk 75.

Sea water contained in the reservoir 60 is fed at a controlled rate through the feed hole 76 onto the distributor surface 77. In order to prevent the calipered feed hole 76 from becoming clogged with salt, a filamentary cleaning member 78 is secured to the re-enforcement disk 75 at 80 and is passed through the feed hole 76 and connected at its other end by means of a pin 81 to the distributor surface 77. A pendulum member comprising a tube 82 and a bulb 83 suspended from the distributor surface 77 as shown by FIGS. 1 and 2 of the drawings causes the surface 77 and filament 78 to reciprocate as the pendulum swings in response to the tilting motions of the still as it floats on the sea, it being understood that the re-enforcement disk 75, the upper surface 84 of the sea water reservoir 60, and the distributor disk surface 77 are all formed of flexible gas tight sheet material. The reciprocatory motion of the filament 78 through the calibrated feed hole opening 76 serves to clean and prevent its clogging with salt crystals or other non-liquid matter.

When first filling the sea water reservoir 60 with sea water, some liquid flows through the equalizer tube 66 and other liquid through the feed hole 76 onto the distributor disk surface 77 near the center thereof and is collected behind the upstanding baffle 85 to first collect in the center portion and to pass through the tube 82 to fill the pendulum bulb 83. After the pendulum bulb 83 and tube 82 have been filled with sea water and additional sea water is pumped into the reservoir 60, the sea water will start to collect on the distributing disk 86 within the baffle 85. As additional sea water accumulates within the baffle 85 it cascades thereover into the outer distributor portion 86. Rocking movement of the still will cause the sea water to cascade over baffle 87 at various positions thereof and collect in the section 88. This rocking movement causes flow of the water in the section 88 so that it will reach the various apertures 90–94 and permit the sea water to fall by gravity through the apertures onto the black cloth surface 26 to be uniformly distributed throughout the surface thereof. It will be noted that the inner concentric baffle 85 is of less height than the outer concentric baffle 87 and the cascade accumulation of sea water on the distributor surface in the right time sequence is thus obtained. At the time of first filling, the flow of water through the equalizer tube 66 is great enough to assure a preliminary flooding and cleaning of the black evaporator surface 26 through the aforementioned equi-radially disposed plurality of distributor feed holes such as shown at 90–94. It should be noted that the size and location of the feed holes 94–94 are such that the sea water is equally distributed in a fine film over the entire black cloth surface 26 of the evaporator 19 to obtain complete saturation thereof. Furthermore, the uniform distribution of the sea water aids in preventing the clogging of the pores of the black cloth surface by the residual salt. The sea water in the filler neck 62 upon the next filling thereof again passes through the equalizer tube 66 to flood the surface of the distributor 86 which additional sea water then passes over baffle 87 to flood and flush any salt crystals collected on the black cloth surface 26.

In order to facilitate the filling of the stabilizer ring tube 20 and the sea water reservoir 60 with sea water a pump such as shown at FIG. 6 of the drawings may be used. This pump is comprised of a nozzle tube 100 having an end 101 shaped to fit the filler neck 62 of the reservoir 60 or the filler plug valve 21 of the stabilizer ring 20. The body of the pump is comprised of sponge material such as the plastic foam 102 enclosed in a water and air impervious sheet of plastic material or envelope 103. In use the pump body is squeezed and the nozzle is placed in the sea water following which the body is released and the sponge material absorbs a volume of sea water. There- after the nozzle end 101 is placed in either of the filler openings for the respective stabilizer tube or sea water reservoir and the pump body is squeezed to pump sea water into the respective member of the still.

It will be seen that when the still is in operation either on land or on sea a closed system is provided since the valves 18, 50 and 63 are all closed. When operating at sea the valve 18 may be opened so long as the drain tube 17 is under water and the length of the drain tube 17 under water automatically controls the draining of excess sea water and predetermines the inflation pressure within the still in accordance with well known laws of physics. The equalizer tube 66 assures that the inflation pressure of the still will be present above the level of sea water in the sea water reservoir 60 so that the flow of sea water through the feed hole 76 and the distributing feed holes 90–94 is entirely controlled by gravity at all times. Also, the motion of the filament 78 due to the swinging of the pendulum, prevents the metered feed hole 76 from clogging. The plurality of equi-radially disposed distributor feed holes such as shown at 90–94 assure the uniform flowing of sea water down the black evaporator surface 26 and the conical shape of the upper portions of the still and its evaporator and condensing surfaces together with the separator ring 40 having a minimum diameter at least as large as the maximum diameter of the evaporator surface prevents any accidental mixing of distilled water and sea water to be evaporated. It should be noted that there are no evaporator surfaces at any point having less diameter than any higher evaporator surfaces as is the case with the spherical stills of the prior art.

Various modifications may be made within the spirit of the invention and the scope of the appended claims.

What is claimed is:

1. A solar still comprising an inflatable bag formed of flexible light transmitting and gas impervious sheet material, said inflatable bag having a generally hemi-spherical base section and a generally conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, means to feed sea water onto the upper outer surfaces of said evaporator member within said bag, and means to collect distilled water passing down the inner wall surfaces of the conical upper section of said bag past the outer edges of said separator ring into the lower base section of said bag.

2. A solar still comprising an inflatable bag formed of flexible light transmitting and gas impervious sheet material, said inflatable bag having a generally hemi-spherical base section and a generally conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, means to feed sea water onto the upper outer surfaces of said evaporator member within said bag, means to collect distilled water passing down the inner wall surfaces of the conical upper section of said bag past the outer edges of said separator ring into the lower base section of said bag, and a ring-shaped stabilizer tube adapted to be filled with a liquid and secured to the exterior of the base section of said bag whereby said bag when inflated may be floated with the conical upper section extending upwards.

3. A solar still comprising an inflatable bag formed of flexible light transmitting and gas impervious sheet material, said inflatable bag having a generally pear shaped configuration with a hemi-spherical base section and a conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, means to feed sea water onto the upper outer surfaces of said evaporator member within said bag, a generally conical shaped separator member of sheet material positioned within the base section of said bag in spaced relation to the inner surface of said bag and extending from said separator ring to the bottom apex of said bag to thereby form a compartment for receiving distilled water between said separator member and said bag and forming said excess sea water compartment below said evaporator member, and means to flow distilled water passing down the inner wall surfaces of the conical upper section of said bag past the outer edges of said separator ring into said compartment of said bag.

4. A solar still comprising an inflatable bag formed of flexible light transmitting and gas impervious sheet material, said inflatable bag having a generally pear shaped configuration with a hemi-spherical base section and a conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, means to feed sea water onto the upper outer surfaces of said evaporator member within said bag, a generally conical shaped separator member of sheet material positioned within the base section of said bag in spaced relation to the inner surface of said bag and extending from said separator ring to the bottom apex of said bag to thereby form a compartment for receiving distilled water between said separator member and said bag and forming said excess sea water compartment below said evaporator member, means to flow distilled water passing down the inner wall surfaces of the conical upper section of said bag past the outer edges of said separator ring into said compartment of said bag, and a ring shaped stabilizer tube adapted to be filled with a liquid and secured to the exterior of the base section of said bag whereby said bag when inflated may be floated with the conical upper section extending upwards.

5. A solar still comprising an inflatable bag formed of flexible light transmitting and gas impervious sheet material, said inflatable bag having a generally pear shaped configuration with a hemi-spherical base section and a conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, a sea water reservoir within said bag adapted to be filled with sea water and positioned at the top of the conical upper section of said bag, normally closed valve means adapted to pass sea water into said reservoir without loss of gas pressure within said bag, a distributing surface of sheet material positioned within said bag beneath said sea water reservoir and adapted to collect sea water from said sea water reservoir, a feed hole in said sea water reservoir to feed sea water from the reservoir to the center area of said distributing surface at a predetermined rate, a plurality of distributing feed holes extending from the edges of said distributing surface through said evaporator member near the upper conical end thereof to distribute sea water over the surface of said evaporator member facing the inner surface of the conical section of said bag, and means to collect distilled water passing down the inner wall surfaces of the conical upper section of said bag past the outer edges of said separator ring into the lower base section of said bag.

6. A solar still comprising an inflatable bag formed of flexible light transmitting and gas impervious sheet material, said inflatable bag having a generally pear shaped configuration with a hemi-spherical base section and a conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, a sea water reservoir within said bag adapted to be filled with sea water and positioned at the top of the conical upper section of said bag, normally closed valve means adapted to pass sea water into said reservoir without loss of gas pressure within said bag, a distributing surface of sheet material positioned within said bag beneath said sea water reservoir and adapted to collect sea water from said sea water reservoir, a feed hole in said sea water reservoir to feed sea water from the reservoir to the center area of said distributing surface at a predetermined rate, a plurality of distributing feed holes extending from the edges of said distributing surface through said evaporator member near the upper conical end thereof to distribute sea water over the surface of said evaporator member facing the inner surface of the conical section of said bag, means to collect distilled water passing down the inner wall surfaces of the conical upper section of said bag past the outer edges of said separator ring into the lower base section of said bag, and a ring shaped stabilizer tube adapted to be filled with a liquid and secured to the exterior of the base section of said bag whereby said bag when inflated may be floated with the conical upper section extending upwards.

7. A solar still comprising an inflatable bag formed of flexible light transmitting and gas impervious sheet material, said inflatable bag having a generally pear shaped configuration with a hemi-spherical base section and a conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, a sea water reservoir within said bag adapted to be filled with sea water and positioned at the top of the conical upper section of said bag, normally closed valve means adapted to pass sea water into said reservoir without loss of gas pressure within said bag, a distributing surface of sheet material positioned within said bag beneath said sea water reservoir and adapted to collect sea water from said sea water reservoir, a feed hole in said sea water reservoir to feed sea water from the reservoir to the center area of said distributing surface at a predetermined rate, a plurality of distributing feed holes extending from the edges of said distributing surface through said evaporator member near the upper conical end thereof to distribute sea water over the surface of said evaporator member facing the inner surface of the conical section of said bag, a generally conical shaped separator member of sheet material positioned within the base section of said bag in spaced relation to the inner surface of said bag and extending from the inner edges of said separator ring to the bottom apex of said bag to thereby form a compartment for receiving distilled water between said separator member and said bag and forming said excess sea water compartment below said evaporator member, and means to flow distilled water passing down the inner wall surfaces of the conical upper section of said bag past the outer edges of said separator ring into said compartment of said bag.

8. A solar still comprising an inflatable bag formed of flexible light transmitting and gas impervious sheet material, said inflatable bag having a generally pear shaped configuration with a hemi-spherical base section and a conical upper section, a light and heat absorbing evaporator member of generally conical shape formed of flexible sheet material supported within said bag in spaced relation to the conical upper section of said bag, an excess sea water compartment for collecting any sea water draining from said evaporator member, a separator ring of larger diameter than the maximum diameter of said evaporator member positioned adjacent the base of said evaporator member within said bag for directing excess sea water into said excess sea water compartment, a sea water reservoir within said bag adapted to be filled with sea water and positioned at the top of the conical upper section of said bag, normally closed valve means adapted to pass sea water into said reservoir without loss of gas pressure within said bag, a distributing surface of sheet material positioned within said bag beneath said sea water reservoir and adapted to collect sea water from said sea water reservoir, a feed hole in said sea water reservoir to feed sea water from the reservoir to the center area of said distributing surface at a predetermined rate, a plurality of distributing feed holes extending from the edges of said distributing surface through said evaporator member near the upper conical end thereof to distribute sea water over the surface of said evaporator member facing the inner surface of the conical section of said bag, a generally conical shaped separator member of sheet material positioned within the base section of said bag in spaced relation to the inner surface of said bag and extending from said separator ring to the bottom apex of said bag to thereby form a compartment for receiving distilled water between said separator member and said bag and forming said excess sea water compartment below said evaporator member, means to flow distilled water passing down the inner wall surfaces of the conical upper section of said bag past the outer edges of said separator ring into said compartment of said bag, and a ring shaped stabilizer tube adapted to be filled with a liquid and secured to the exterior of the base section of said bag whereby said bag when inflated may be floated with the conical upper section extending upwards.

9. The invention of claim 5 in which a pendulum member is suspended within said bag from said distributing surface, and a filament is connected to said distributing surface and is passed through the feed hole of said sea water reservoir whereby motion of said pendulum causes motion of said filament to prevent clogging of said feed hole.

10. The invention of claim 9 in which said pendulum member is comprised of a tube extending downward from the center portion of said distributing surface to a bulb within said bag and is adapted to be filled with sea water from said distributing surface.

11. The invention of claim 10 in which said distributing surface is provided with a plurality of concentric baffle rings on its upper surface with the outermost ring of greater height than the next adjacent ring to thereby cascade the collection of sea water over the distributing surface from its inner portion to its outer portion as the sea water is collected thereon from the sea water reservoir to thus enable the tube and bulb of said pendulum to be filled with sea water.

12. The invention of claim 6 in which a pendulum member is suspended within said bag from said distributing surface, and a filament is connected to said distributing surface and is passed through the feed hole of said sea water reservoir whereby motion of said pendulum causes motion of said filament to prevent clogging of said feed hole.

13. The invention of claim 12 in which said pendulum member is comprised of a tube extending downward from the center portion of said distributing surface to a bulb within said bag and is adapted to be filled with sea water from said distributing surface.

14. The invention of claim 7 in which a pendulum member is suspended within said bag from said distributing surface, and a filament is connected to said distributing surface and is passed through the feed hole of said sea water reservoir whereby motion of said pendulum causes motion of said filament to prevent clogging of said feed hole.

15. The invention of claim 14 in which said pendulum member is comprised of a tube extending downward from the center portion of said distributing surface to a bulb within said bag and is adapted to be filled with sea water from said distributing surface.

16. The invention of claim 8 in which a pendulum member is suspended within said bag from said distributing surface, and a filament is connected to said distributing surface and is passed through the feed hole of said sea water reservoir whereby motion of said pendulum causes motion of said filament to prevent clogging of said feed hole.

17. The invention of claim 16 in which said pendulum member is comprised of a tube extending downward from the center portion of said distributing surface to a bulb within said bag and is adapted to be filled with sea water from said distributing surface.

18. The invention of claim 4 in which a drain tube of predetermined length is connected to extend beneath the base section of said bag and is passed through said bag and separator member into the interior of said bag to drain sea water collecting therein.

19. The invention of claim 4 in which a distilled water collecting tube is passed through the base section of said bag into said compartment, said tube having a valve at its outer end to enable the bag to be inflated and distilled water collecting in said compartment to be withdrawn.

20. The invention of claim 5 in which a pressure equalizing tube is secured in said reservoir to pass gas under pressure from within the upper section of said bag to the upper part of said reservoir, said tube also permitting sea water to flow onto said distributing surface in excess of that passing through said feed hole to flush salt water crystals from said evaporator member into said excess sea water compartment when said reservoir is being filled with sea water.

21. The invention of claim 1 in which said separator ring is comprised of collapsible plastic foam material having an outer layer of plastic sheet material secured thereto.

22. A solar still comprising an inflatable bag formed of flexible light transmitting and gas impervious sheet material, a light and heat absorbing evaporator member formed of flexible sheet material supported within said bag in spaced relation to said bag, an excess sea water compartment for collecting any sea water draining from said evaporator member, means positioned adjacent the base of said evaporator member for directing excess sea water from said evaporator member into said excess sea water compartment, means to feed sea water onto the outer surfaces of said evaporator member, and means to collect distilled water passing down the inner wall surfaces of said bag.

23. The invention of claim 1 in which said evaporator member has a sheet of insulating material secured to its inner surface which functions to reflect heat absorbed by said evaporator member to said evaporator member and further functions to insulate said evaporator member from the interior of the still.

24. The invention of claim 22 in which said evaporator member has a sheet of insulating material secured to its inner surface which functions to reflect heat absorbed by said evaporator member to said evaporator member and further functions to insulate said evaporator member from the interior of the still.

25. The invention of claim 1 wherein said evaporator member is suspended within said bag for free relative movement so that the evaporator member will be properly aligned therein during and after inflation of the still.

26. The invention of claim 22 wherein said evaporator member is suspended within said bag for free relative movement so that the evaporator member will be properly aligned therein during and after inflation of the still.

27. The invention of claim 5 wherein said distributor surface has concentric baffles on its upper surface so that sea water accumulated on said distributor surface cascades over said baffles by the rocking movement of the still and is distributed over said evaporator member.

28. The invention of claim 5 further including a tube secured in the upper portion of the still to permit sea water to flow from the upper portion of the still onto said distributing surface in excess of that passing through said feed hole to flush salt crystals from said evaporator member into said excess sea water compartment.

References Cited

UNITED STATES PATENTS

| | | | |
|---|---|---|---|
| 2,412,466 | 12/1946 | Miller | 202—234 |
| 2,455,835 | 12/1948 | Ushakoff | 202—234 |

FOREIGN PATENTS

| | | |
|---|---|---|
| 788,753 | 1/1958 | Great Britain. |
| 790,004 | 1/1958 | Great Britain. |
| 812,804 | 4/1959 | Great Britain. |
| 832,123 | 4/1960 | Great Britain. |
| 887,949 | 1/1962 | Great Britain. |
| 968,477 | 9/1964 | Great Britain. |

WILBUR L. BASCOMB, JR., *Primary Examiner.*